(12) United States Patent
Armstrong

(10) Patent No.: US 6,714,052 B2
(45) Date of Patent: Mar. 30, 2004

(54) METHOD AND APPARATUS FOR PASSIVE COMPONENT MINIMIZATION OF CONNECTOR PINS IN A COMPUTER SYSTEM

(75) Inventor: Anthony Armstrong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 582 days.

(21) Appl. No.: 09/770,570

(22) Filed: Jan. 26, 2001

(65) Prior Publication Data

US 2003/0188078 A1 Oct. 2, 2003

(51) Int. Cl.[7] .......................... H03K 19/08; H03K 5/22
(52) U.S. Cl. ........................ 326/105; 326/62; 327/75
(58) Field of Search ....................... 326/62, 82, 105; 307/139; 327/56, 75

(56) References Cited

U.S. PATENT DOCUMENTS

| | | | |
|---|---|---|---|
| 3,932,714 A | * | 1/1976 | Guimier et al. ............ 191/12 R |
| 5,367,204 A | * | 11/1994 | Mattison ....................... 327/75 |
| 5,734,208 A | | 3/1998 | Jones |
| 5,875,142 A | * | 2/1999 | Chevallier .................. 365/212 |

* cited by examiner

Primary Examiner—Daniel Chang
(74) Attorney, Agent, or Firm—Haynes and Boone, LLP

(57) ABSTRACT

In a computer system, a passive component minimization of connector pins configuration includes a motherboard and daughterboard. The daughterboard includes a selection switch coupled via passive components to a single connector pin, according to a prescribed state of multiple states of the daughterboard. In one embodiment, the passive components include three series connected resistors collectively coupled to the daughterboard connector pin. The motherboard includes a supply voltage and pull-up resistor circuit coupled to a single connector pin, and further includes decoding circuitry coupled to the motherboard connector pin for decoding a voltage level of the motherboard connector pin into binary data. Responsive to a mating of the daughterboard connector pin with the motherboard connector pin, the decoding circuitry converts voltage level data present at the motherboard connector pin into binary data representative of a current state of the daughterboard as a function of the selection switch and passive components of the daughterboard.

21 Claims, 1 Drawing Sheet

METHOD AND APPARATUS FOR PASSIVE COMPONENT MINIMIZATION OF CONNECTOR PINS IN A COMPUTER SYSTEM

BACKGROUND

The present embodiments generally relate to termination circuits for electronic signals, and more particularly, to a passive component minimization of connector pins in a computer system.

In the manufacture of electronic equipment, often there are constraints on real estate or component keep-outs when developing and/or designing a printed circuit board (PCB) for use in the electronic equipment. An exemplary PCB may include a daughterboard for coupling to a motherboard in the computer system. In addition to the daughterboard, such constraints may also occur with other POB's, for instance control panels (used for power buttons, LED's, reset buttons, etc. in a computer system).

The daughterboard and other PCB's are characterized as being very small, and very inexpensive. Such PCB's are extremely cost-sensitive, and preferably are singled-sided. Accordingly, in the design and development of such PCB's, the desired characteristics limit a design choice to through-hole, passive components.

However, sometimes for a given design requirement, multiple states need to be transmitted to/from the PCB and pin count on the PCB connectors is limited. Integrated circuits (IC's) or multiplexers could be used, however they are expensive and complex. Accordingly, such IC's and/or multiplexers are undesirable, for example from a manufacturing cost standpoint.

Therefore what is needed is an improved passive component minimization of connector pins in a computer system.

SUMMARY

In a computer system, a passive component minimization of connector pins configuration includes a motherboard and a daughterboard. The daughterboard includes a selection switch coupled via passive components to a single connector pin, according to a prescribed state of multiple states of the daughterboard. In one embodiment, the passive components include three series connected resistors collectively coupled to the daughterboard connector pin. The motherboard includes a supply voltage and pull-up resistor circuit coupled to a single connector pin, and further includes decoding circuitry coupled to the motherboard connector pin for decoding a voltage level of the motherboard connector pin into binary data. Responsive to a mating of the daughterboard connector pin with the motherboard connector pin, the decoding circuitry converts voltage level data present at the motherboard connector pin into binary data representative of a current state of the daughterboard as a function of the selection switch and passive components of the daughterboard.

A technical advantage is that the present embodiments achieve an improved passive component minimization of connector pins in a computer system.

DETAILED DESCRIPTION

According to one embodiment of the present disclosure, a series of resistors with different grounding points, and a pull-up to a voltage (such as 5V), enable an input voltage (i.e., the voltage at the connector pin) to be set to a specific level depending upon a desired state of a PCB card, such as a daughterboard. The mating PCB (such as a motherboard or similar receiving board or component connector) is provided with decoding circuitry for use in decoding the input voltage. The decoding circuitry includes comparators and gates for converting the voltage level data to binary data for inputs into GPI's or other logic of the mating PCB.

Figure 1:
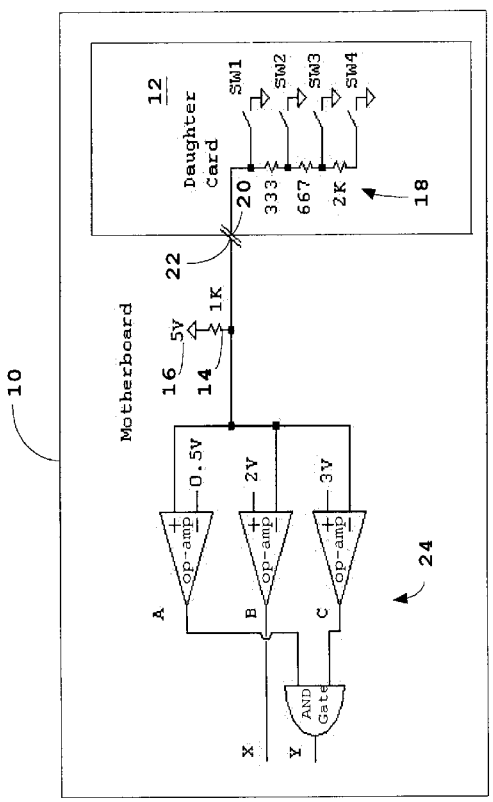
FIG. 1 is a schematic view diagram of a passive component minimization of connector pins according to an embodiment of the present disclosure.

Turning now to FIG. 1, an exemplary motherboard 10 and daughterboard 12 are illustrated. In the embodiment of FIG. 1, the motherboard includes a 1 k-ohm pull-up resistor 14 coupled to a pull-up voltage 16, for example 5V.

The daughterboard (or daughtercard) 12 includes a series of three resistors 18 (i.e., passive components), and four possible grounding points, for setting a desired voltage at the connector pin 20 upon a coupling of the daughtercard 12 to the motherboard 10 via the mating connector pins 20, 22. In other words, the three series resistors and four possible grounding points enable a desired voltage level to be set, as a function of the passive components and selected grounding point.

In particular, according to one embodiment, the series of resistors 18 include a first resistor having a nominal resistance value of 333 ohms, a second resistor having a nominal resistance of 667 ohms, and a third resistor having a nominal resistance of 2 k-ohms. A first switch SW1, when selected and triggered (i.e., in closed position), causes the connector pin to have a voltage level on the order of ground potential when the daughtercard is coupled to the motherboard. A second switch SW2, when selected and triggered (i.e., in closed position), causes the connector pin to have a voltage level on the order of 1.25 V (i.e., (333 ohm/(1 kohm+333 ohm))×5V=1.25 V) when the daughtercard is coupled to the motherboard. In a similar manner, switch SW3, when selected and triggered, causes the connector pin to have a voltage level on the order of 2.5 V. Switch SW4, when selected and triggered, causes the connector pin to have a voltage level on the order of 3.75 V.

Note that the selection of more than one of the switches at a same time causes the voltage to be determined based upon which of the switches is selected according to the priority order of SW1, SW2, SW3, and SW4, respectively. For instance, if both SW1 and SW4 are selected, then SW1 controls the voltage of the connector pin 20.

In addition to the 5V supply voltage and the 1 k-ohm pull-up resistor, the motherboard 10 includes decoding circuitry 24. The decoding circuitry includes three two-input op-amps and one logical AND gate for converting the voltage at the connector pin 22 into two bits (X and Y). The two bits define which of the four possible states the voltage level is at. Accordingly, the implementation of FIG. 1 only requires one pin for the four individual states.

A non-inverting input of a first op-amp A couples to the connector pin 22. An inverting input of op-amp A is connected to a voltage on the order of 0.5 V. The non-inverting input of a second op-amp B couples to a voltage on the order of 2 V, and the inverting input couples to the connector pin 22. Similarly, the non-inverting input of a third op-amp C couples to a voltage on the order of 3 V, and the inverting input couples to the connector pin 22. The output of op-amp B determines the logical state of bit X. The logical AND of the outputs of op-amps A and C determines the logical state of bit Y.

In the embodiment of FIG. 1, triggering switch SW1 would yield the two bits X,Y equal to 10, switch SW2 would yield X,Y equal to 11, switch SW3 would yield X,Y equal to 01, and switch SW4 would yield X,Y equal to 00.

According to one embodiment of the present disclosure, in a computer, a passive component minimization of connector pins configuration includes a daughterboard or card and a motherboard, as follows. The daughterboard includes at least one selection switch coupled via passive components to a single connector pin. The connector pin is characterized as being of a first origin, for example, a female connector.

The at least one selection switch provides a means for selectively connecting the passive components to the single connector pin representative of a prescribed state of a number of states of the daughterboard. In other words, the prescribed state of the number of prescribed states is selectable as a function of the at least one selection switch and the passive components.

The motherboard includes a supply voltage and pull-up resistor circuit coupled to a single connector pin. The connector pin of the motherboard is characterized as being of a second origin, for example, a male connector. The motherboard further includes decoding circuitry coupled to the motherboard connector pin.

The decoding circuitry decodes a voltage level of the motherboard connector pin into binary data. In response to a mating of the daughterboard connector pin with the motherboard connector pin, the decoding circuitry converts voltage level data present at the motherboard connector pin into binary data representative of a current state of the daughterboard as a function of the at least one selection switch and passive components of the daughterboard.

In one embodiment, the decoding circuitry includes first, second, and third op-amps. The first op-amp includes a non-inverting input coupled to the motherboard connector pin and an inverting input coupled to a first reference voltage. The second op-amp includes an inverting input coupled to the motherboard connector pin and a non-inverting input coupled to a second reference voltage. Lastly, the third op-amp includes an inverting input coupled to the motherboard connector pin and a non-inverting input coupled to a third reference voltage. In addition, the decoding circuitry further includes a logical AND gate for logically ANDing outputs of the first and third op-amp. An output of the second op-amp and an output of the AND gate represent two bits for defining four possible states of the daughterboard.

As mentioned above and as shown in FIG. 1, in one embodiment, the voltage supply includes a 5 volt supply and the pull-up resistor includes a 1 k-ohm resistor. The first reference potential includes a nominal 0.5 V potential. The second reference potential includes a nominal 2.0 V potential. Lastly, the third reference potential includes a nominal 3.0 V potential. Other sets of parameter values are also possible, according to the requirements of a particular electronic apparatus or computer system implementation.

Further as shown in FIG. 1, according to one embodiment, the passive components of the daughterboard 12 include three series connected resistors 18. The three series connected resistors are collectively coupled at a first end thereof to the daughterboard connector pin 20. In addition, the at least one selection switch includes four switches. The first switch couples between the daughterboard connector pin and ground potential. The second switch couples between the first and second of the three series connected resistors and ground potential. The third switch couples between the second and third of the three series connected resistors and ground potential. Lastly, the fourth switch couples between a second end of the series connected resistors (opposite the first end) and ground potential. Values may be assigned to the resistors as follows: the first resistor includes a nominal 333 ohm resistor, the second resistor includes a nominal 667 ohm resistor, and the third resistor includes a nominal 2 kohm resistor. Other sets of values are also possible, according to the requirements of a given implementation.

Figure 2:
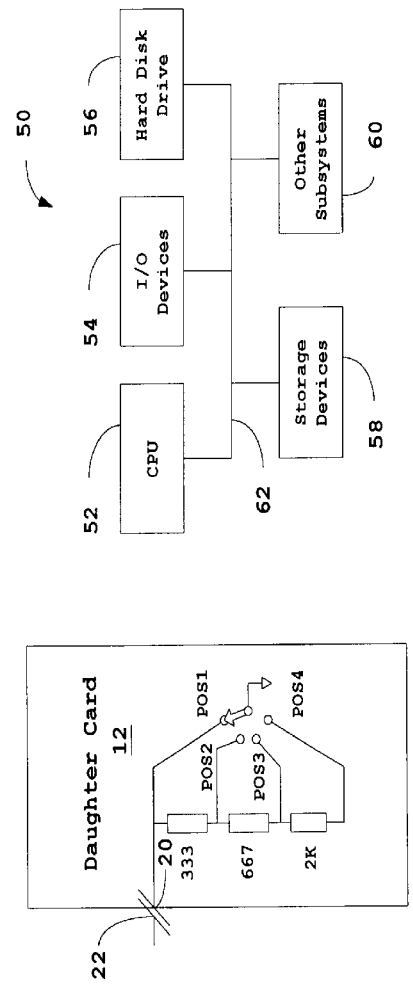
FIG. 2 is a schematic view diagram of a passive component minimization of connector pins according to an alternate embodiment of the present disclosure.

According to an alternate embodiment as shown in FIG. 2, the passive components 18 of the daughterboard can include three series connected resistors collectively coupled at a first end thereof to the daughterboard connector pin. The at least one selection switch can include a single switch having four positions. A first position POS1 is for coupling the daughterboard connector pin directly to ground potential. A second position POS2 is for coupling the daughterboard connector pin to ground potential via a first of the three series connected resistors. A third position POS3 for coupling the daughterboard connector pin to ground potential via the first and a second resistor of the three series connected resistors. Lastly, a fourth position POS4 is for coupling the daughterboard connector pin to ground potential via the first, second, and a third resistor of the three series connected resistors.

Figure 3:
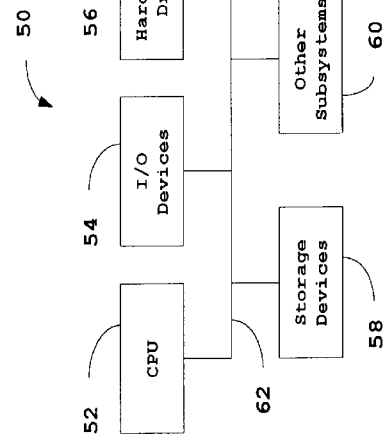
FIG. 3 illustrates a block diagram view of a computer system including passive component minimization of connector pins according to the embodiments of the present disclosure.

With reference now to FIG. 3, a system block diagram of a computer system 50 is shown having a printed circuit board of FIG. 1 and/or other system element manufactured in accordance with the method and apparatus of the present disclosure. The computer system includes a central processing unit (CPU) 52, input/output (I/O) devices, such as a display, a keyboard, a mouse or other pointer device, and associated controllers, collectively designated by a reference numeral 54, a hard disk drive 56, and other storage devices, such as may include a floppy disk drive, CD-ROM drive, and the like, collectively designated by reference numeral 58, and various other subsystems, such as a network interface card, collectively designated by reference numeral 60, all interconnected via one or more buses, shown collectively as a bus 62. One or more of the components of the computer system may be manufactured on a printed circuit board manufactured in accordance with the embodiments of the present disclosure.

Although only a few exemplary embodiments have been described in detail above, those skilled in the art will readily appreciate that many modifications are possible in the exemplary embodiments without materially departing from the novel teachings and advantages described herein. Accordingly, all such modifications are intended to be included within the scope of the embodiments as defined in the following claims. In the claims, means-plus-function clauses are intended to cover the structures described herein as performing the recited function and not only structural equivalents, but also equivalent structures.

What is claimed:

1. In a computer, a passive component minimization of connector pins configuration comprising:

a daughterboard including at least one selection switch coupled via passive components to a single connector pin of a first origin, the at least one selection switch for selectively connecting the passive components to the single connector pin representative of a prescribed state of a number of states of said daughterboard, the prescribed state of the number of states being selectable as a function of the at least one selection switch and the passive components; and a motherboard including a supply voltage and pull-up resistor circuit coupled to a single connector pin of a second origin, said motherboard further including decoding circuitry coupled to the motherboard connector pin for decoding a voltage level of the motherboard connector pin into binary data, wherein responsive to a mating of the daughterboard connector pin with the motherboard connector pin, the decoding circuitry converts voltage level data present at the motherboard connector pin into binary data representative of a current state of said daughterboard as a function of the at least one selection switch and passive components of said daughterboard.

2. The configuration of claim 1, wherein the decoding circuitry includes first, second, and third op-amps, the first op-amp having a non-inverting input coupled to the motherboard connector pin and an inverting input coupled to a first reference voltage, the second op-amp having an inverting input coupled to the motherboard connector pin and a non-inverting input coupled to a second reference voltage, and the third op-amp having an inverting input coupled to the motherboard connector pin and a non-inverting input coupled to a third reference voltage, the decoding circuitry further including a logical AND gate for logically ANDing outputs of the first and third op-amp, wherein an output of the second op-amp and an output of the AND gate represent two bits for defining four possible states.

3. The configuration of claim 2, wherein the voltage supply includes a 5 volt supply and the pull-up resistor includes a 1 kohm resistor.

4. The configuration of claim 2, wherein the first reference potential includes a nominal 0.5 V potential, the second reference potential includes a a nominal 2.0 V potential, and the third reference potential includes a nominal 3.0 V potential.

5. The configuration of claim 1, wherein the passive components of said daughterboard include three series connected resistors collectively coupled at a first end thereof to the daughterboard connector pin and wherein the at least one selection switch includes four switches, a first switch being coupled between the daughterboard connector pin and ground potential, the second switch coupled between the first and second of the three series connected resistors and ground potential, the third switch coupled between the second and third of the three series connected resistors and ground potential, and a fourth switch coupled between a second end of the series connected resistors opposite the first end and ground potential.

6. The configuration of claim 5, wherein the first resistor includes a nominal 333 ohm resistor, the second resistor includes a nominal 667 ohm resistor, and the third resistor includes a nominal 2 kohm resistor.

7. The configuration of claim 1, wherein the passive components of said daughterboard include three series connected resistors collectively coupled at a first end thereof to the daughterboard connector pin and wherein the at least one selection switch includes a single switch having four positions, a first position for coupling the daughterboard connector pin directly to ground potential, a second position for coupling the daughterboard connector pin to ground potential via a first of the three series connected resistors, a third position for coupling the daughterboard connector pin to ground potential via the first and a second resistor of the three series connected resistors, and a fourth position for coupling the daughterboard connector pin to ground potential via the first, second, and a third resistor of the three series connected resistors.

8. The configuration of claim 1, wherein said daughterboard is a single-sided printed circuit board characterized by through hole, passive components.

9. A method for passive component minimization of connector pins comprising:

coupling at least one selection switch via passive components to a single connector pin of a daughterboard, the connector pin being of a first origin and the at least one selection switch for selectively connecting the passive components to the single connector pin representative of a prescribed state of a number of states of the daughterboard, the prescribed state of the number of prescribed states being selectable as a function of the at least one selection switch and the passive components;

coupling a supply voltage and pull-up resistor circuit to a single connector pin of a motherboard, the connector pin being of a second origin; and coupling decoding circuitry to the motherboard connector pin for decoding a voltage level of the motherboard connector pin into binary data, wherein responsive to a mating of the daughterboard connector pin with the motherboard connector pin, the decoding circuitry converts voltage level data present at the motherboard connector pin into binary data representative of a current state of the daughterboard as a function of the at least one selection switch and passive components of the daughterboard.

10. The method of claim 9, wherein coupling decoding circuitry to the motherboard connector pin includes coupling decoding circuitry having first, second, and third op-amps, the first op-amp having a non-inverting input coupled to the motherboard connector pin and an inverting input coupled to a first reference voltage, the second op-amp having an inverting input coupled to the motherboard connector pin and a non-inverting input coupled to a second reference voltage, and the third op-amp having an inverting input coupled to the motherboard connector pin and a non-inverting input coupled to a third reference voltage, the decoding circuitry further including a logical AND gate for logically ANDing outputs of the first and third op-amp, wherein an output of the second op-amp and an output of the AND gate represent two bits for defining four possible states.

11. The method of claim 10, wherein the voltage supply includes a 5 volt supply and the pull-up resistor includes a 1 kohm resistor.

12. The method of claim 10, wherein the first reference potential includes a nominal 0.5 V potential, the second reference potential includes a nominal 2.0 V potential, and the third reference potential includes a nominal 3.0 V potential.

13. The method of claim 9, wherein coupling the at least one selection switch via passive components includes coupling three series connected resistors collectively at a first end thereof to the daughterboard connector pin and wherein the at least one selection switch includes four switches, a first switch being coupled between the daughterboard connector pin and ground potential, the second switch coupled between the first and second of the three series connected resistors and ground potential, the third switch coupled between the second and third of the three series connected resistors and ground potential, and a fourth switch coupled between a second end of the series connected resistors opposite the first end and ground potential.

14. The method of claim 13, wherein the first resistor includes a nominal 333 ohm resistor, the second resistor includes a nominal 667 ohm resistor, and the third resistor includes a nominal 2 kohm resistor.

15. The method of claim 9, wherein coupling the at least one selection switch via passive components includes coupling three series connected resistors collectively at a first end thereof to the daughterboard connector pin and wherein the at least one selection switch includes a single switch having four positions, a first position for coupling the daughterboard connector pin directly to ground potential, a second position for coupling the daughterboard connector pin to ground potential via a first of the three series connected resistors, a third position for coupling the daughterboard connector pin to ground potential via the first and a second resistor of the three series connected resistors, and a fourth position for coupling the daughterboard connector pin to ground potential via the first, second, and a third resistor of the three series connected resistors.

16. The method of claim 9, wherein the daughterboard is a single-sided printed circuit board characterized by through hole, passive components.

17. An apparatus having a passive component minimization of connector pins configuration comprising:

a secondary printed circuit board including at least one selection switch coupled via passive components to a single connector pin of a first origin, the at least one selection switch for selectively connecting the passive components to the single connector pin representative of a prescribed state of a number of states of said secondary printed circuit board, the prescribed state of the number of prescribed states being selectable as a function of the at least one selection switch and the passive components; and a primary printed circuit board including a supply voltage and pull-up resistor circuit coupled to a single connector pin of a second origin, said primary circuit board further including decoding circuitry coupled to the primary circuit board connector pin for decoding a voltage level of the primary circuit board connector pin into binary data, wherein responsive to a mating of the secondary printed circuit board connector pin with the primary printed circuit board connector pin, the decoding circuitry converts voltage level data present at the primary printed circuit board connector pin into binary data representative of a current state of said secondary printed circuit board as a function of the at least one selection switch and passive components of said secondary printed circuit board.

18. The apparatus of claim 17, wherein the decoding circuitry includes first, second, and third op-amps, the first op-amp having a non-inverting input coupled to the primary printed circuit board connector pin and an inverting input coupled to a first reference voltage, the second op-amp having an inverting input coupled to the primary printed circuit board connector pin and a non-inverting input coupled to a second reference voltage, and the third op-amp having an inverting input coupled to the primary printed circuit board connector pin and a non-inverting input coupled to a third reference voltage, the decoding circuitry further including a logical AND gate for logically ANDing outputs of the first and third op-amp, wherein an output of the second op-amp and an output of the AND gate represent two bits for defining four possible states.

19. The apparatus of claim 17, wherein the passive components of said secondary printed circuit board include three series connected resistors collectively coupled at a first end thereof to the secondary printed circuit board connector pin and wherein the at least one selection switch includes four switches, a first switch being coupled between the secondary printed circuit board connector pin and ground potential, the second switch coupled between the first and second of the three series connected resistors and ground potential, the third switch coupled between the second and third of the three series connected resistors and ground potential, and a fourth switch coupled between a second end of the series connected resistors opposite the first end and ground potential.

20. The apparatus of claim 17, wherein the passive components of said secondary printed circuit board include three series connected resistors collectively coupled at a first end thereof to the secondary printed circuit board connector pin and wherein the at least one selection switch includes a single switch having four positions, a first position for coupling the secondary printed circuit board connector pin directly to ground potential, a second position for coupling the secondary printed circuit board connector pin to ground potential via a first of the three series connected resistors, a third position for coupling the secondary printed circuit board connector pin to ground potential via the first and a second resistor of the three series connected resistors, and a fourth position for coupling the secondary printed circuit board connector pin to ground potential via the first, second, and a third resistor of the three series connected resistors.

21. The apparatus of claim 17, wherein said secondary printed circuit board is a single-sided printed circuit board characterized by through hole, passive components.

* * * * *